Dec. 15, 1925.
F. HIMMEL ET AL
STORE FRONT CONSTRUCTION
Filed May 29, 1925
1,566,004
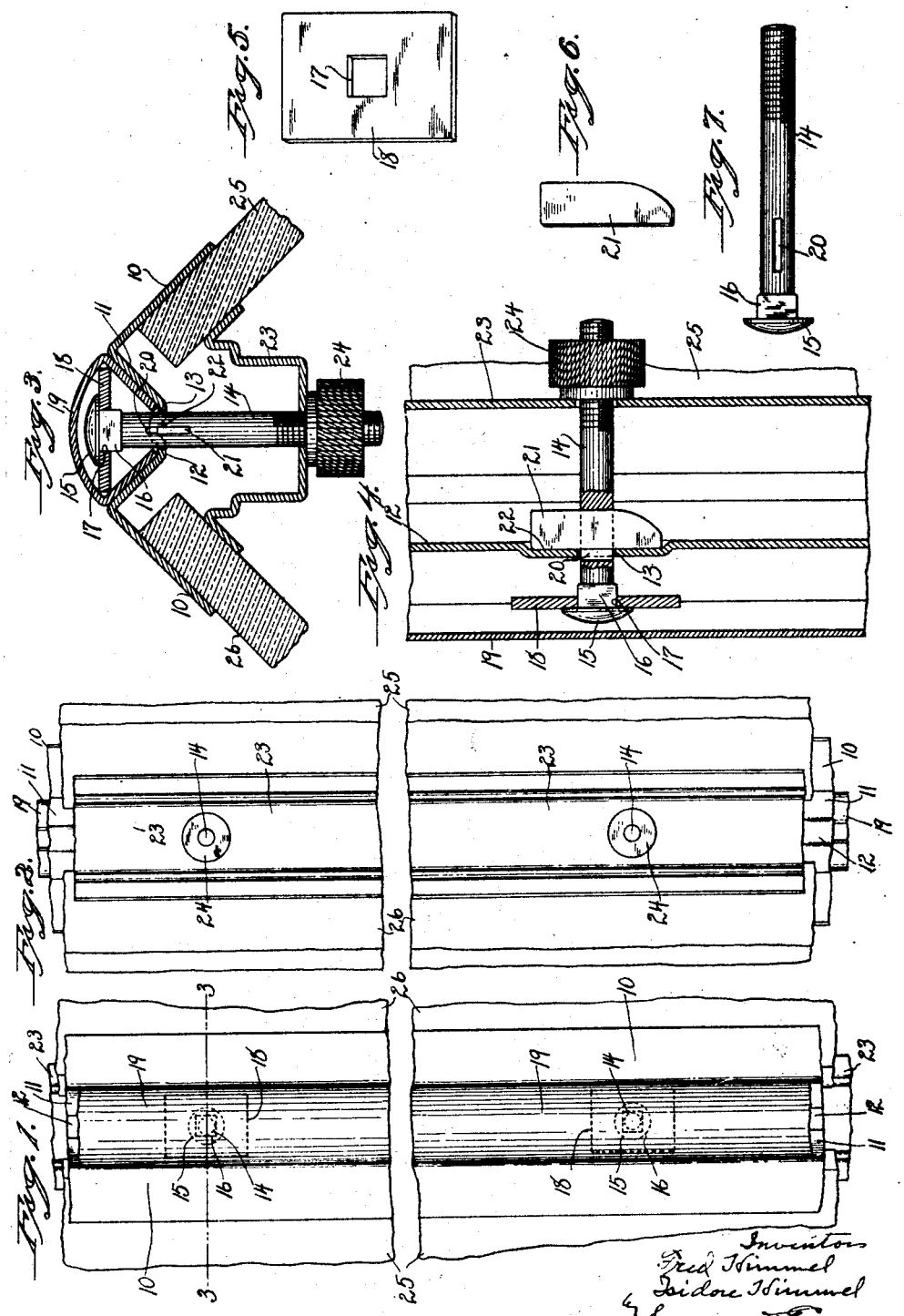

Patented Dec. 15, 1925.

1,566,004

UNITED STATES PATENT OFFICE.

FRED HIMMEL AND ISIDORE HIMMEL, OF NEW HAVEN, CONNECTICUT.

STORE-FRONT CONSTRUCTION.

Application filed May 29, 1925. Serial No. 33,821.

*To all whom it may concern:*

Be it known that we, FRED HIMMEL and ISIDORE HIMMEL, citizens, respectively, of the United States and Austria, residing at New Haven, in the county of New Haven and State of Connecticut, have invented a new and useful Improvement in Store-Front Constructions; and we do hereby declare the following, when taken in connection with the accompanying drawings, and the characters of reference marked thereon, to be a full, clear, and exact description of the same, and which said drawings constitute part of this application and represent, in—

Fig. 1 a front view of a store-front construction embodying our invention.

Fig. 2 an inside view of the same.

Fig. 3 a sectional view on the line 3—3 of Fig. 1.

Fig. 4 a vertical, sectional view through one of the fastening-bolts.

Fig. 5 a perspective view of a channel-washer detached.

Fig. 6 a perspective view of a bolt-locking key detached.

Fig. 7 a side view of a locking-bolt detached.

This invention relates to improvement in store-front construction, and particularly to constructions embodying an outer strip formed with a channel and a channel-strip located in the said channel. Means must be provided for holding the channel-strip in the outer strip, and this is usually done through the medium of bolts or screws, which also form means for connecting the inner strip in position. The object of this invention is to provide simple and convenient means for connecting the channel-strip with the outer strip, and the invention consists in the construction as hereinafter described and particularly recited in the claim.

In carrying out our invention, we employ an outer member 10 of substantially usual construction, bent to form a centrally-arranged channel 11, the base 12 of the channel being formed at intervals with perforations 13 for the passage of bolts 14. Preferably these bolts are formed underneath their heads 15 with angular shoulders 16, to enter angular holes 17 formed in rectangular washers 18, which are arranged within the usual channel-strips 19, which enter the channels 11. The bolts 14 are formed with transverse slots 20 to receive wedge-shaped keys 21, and preferably the bases 12, at the points where they are formed with clearance-perforations 13, are formed with longitudinal depressions 22 to receive the keys 21, as shown in Fig. 4 of the drawings. The washers 18 form an anchorage for the bolts, and when the keys are inserted, the channel-strips are firmly held in the channels. The bolts 14 project inward through inner strips 23 of usual construction, which are held in place by nuts 24 turned onto the ends of the bolts, whereby sheets of glass 25 and 26 are firmly held between the inner and outer strips.

While we prefer to employ the angular washers as above described, as they not only assist in holding the channel-strip in place but prevent the bolts from turning, bolts of ordinary construction may be used, if provided with the transverse slots and keys 21, as the keys 21, entering the depressions 22, will prevent the bolts from being turned.

We claim:

A store-front construction, comprising an outer strip formed with a channel, including a base having perforations at intervals, a channel-strip located in said channel, an angular washer in said channel-strip, said washer having an angular opening, a bolt having an angular portion to enter the angular hole in the washer, said bolt formed with a transverse slot, said base formed with longitudinal depression adjacent the said perforations, and a key extending through the slot in the bolt and located in said depression.

In testimony whereof, we have signed this specification.

FRED HIMMEL.
ISIDORE HIMMEL.